(12) United States Patent
Park et al.

(10) Patent No.: US 9,961,330 B2
(45) Date of Patent: May 1, 2018

(54) DEVICE AND METHOD OF GENERATING MULTI-VIEW IMMERSIVE CONTENT

(71) Applicant: ELECTRONICS AND TELECOMMUNICATIONS RESEARCH INSTITUTE, Daejeon (KR)

(72) Inventors: Jeung Chul Park, Daejeon (KR); Hyung Jae Son, Daejeon (KR); Beom Ryeol Lee, Daejeon (KR); Il Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 191 days.

(21) Appl. No.: 15/058,292

(22) Filed: Mar. 2, 2016

(65) Prior Publication Data
US 2016/0261855 A1 Sep. 8, 2016

(30) Foreign Application Priority Data
Mar. 2, 2015 (KR) .......................... 10-2015-0029168

(51) Int. Cl.
*H04N 13/02* (2006.01)
*H04N 13/04* (2006.01)
(Continued)

(52) U.S. Cl.
CPC .......... *H04N 13/0282* (2013.01); *G06T 7/11* (2017.01); *G06T 7/174* (2017.01); *G06T 7/194* (2017.01);
(Continued)

(58) Field of Classification Search
CPC ............ H04N 13/0282; H04N 13/0257; G06T 7/194; G06T 7/11; G06T 7/174
See application file for complete search history.

(56) References Cited

U.S. PATENT DOCUMENTS

| 5,659,323 A * | 8/1997 | Taylor ................. G03B 19/026 348/159 |
| 7,027,083 B2 | 4/2006 | Kanade et al. |

(Continued)

FOREIGN PATENT DOCUMENTS

| JP | 2005-509342 A | 4/2005 |
| JP | 2006-323012 A | 11/2006 |

(Continued)

OTHER PUBLICATIONS

Zhang et al, "HSV color space and codebook model based moving objects detection," 2008, Systems Engineering and Electronics, vol. 30, Issue 3, pp. 423-427 (Chinese Language).*

(Continued)

*Primary Examiner* — David F Dunphy
(74) *Attorney, Agent, or Firm* — LRK Patent Law Firm

(57) ABSTRACT

Provided is a method of generating multi-view immersive content. The method includes obtaining a multi-view background image from a plurality of cameras arranged in a curved shape, modeling the obtained multi-view background image to generate a codebook corresponding to the multi-view background image, obtaining a multi-view image including an object from the plurality of cameras and separating a foreground and a background from the obtained multi-view image by using the generated codebook, and synthesizing the object included in the separated foreground with a virtual background to generate multi-view immersive content.

14 Claims, 13 Drawing Sheets

(51) Int. Cl.
*G06T 7/11* (2017.01)
*G06T 7/174* (2017.01)
*G06T 7/194* (2017.01)
*H04N 13/00* (2018.01)

(52) U.S. Cl.
CPC ............ *H04N 13/0257* (2013.01); *G06T 2207/10024* (2013.01); *H04N 2013/0092* (2013.01)

(56) References Cited

U.S. PATENT DOCUMENTS

| | | | |
|---|---|---|---|
| 8,538,150 B2 | 9/2013 | Kim et al. | |
| 2004/0208359 A1 | 10/2004 | Pishva | |
| 2009/0315978 A1* | 12/2009 | Wurmlin | G06T 5/005 348/43 |
| 2011/0142343 A1* | 6/2011 | Kim | G06K 9/38 382/173 |
| 2011/0149074 A1 | 6/2011 | Lee et al. | |

FOREIGN PATENT DOCUMENTS

| | | |
|---|---|---|
| JP | 2014-103490 A | 6/2014 |
| KR | 10-0948691 B1 | 3/2010 |
| KR | 10-2011-0066609 A | 6/2011 |

OTHER PUBLICATIONS

Zhang et al, "HSV color space and codebook model based moving objects detection," 2008, Systems Engineering and Electronics, vol. 30, Issue 3, 25 pages (English Translation for above reference of same name).*

Kyungnam Kim et al., "Background Modeling and Subtraction by Codebook Construction", ICIP'04, Oct. 2004, vol. 5 pp. 3061-3064.

Notice of Allowance dated Nov. 23, 2017 of the KR Patent Application No. 10-2015-0029168 corresponding to the above-referenced U.S. application.

* cited by examiner

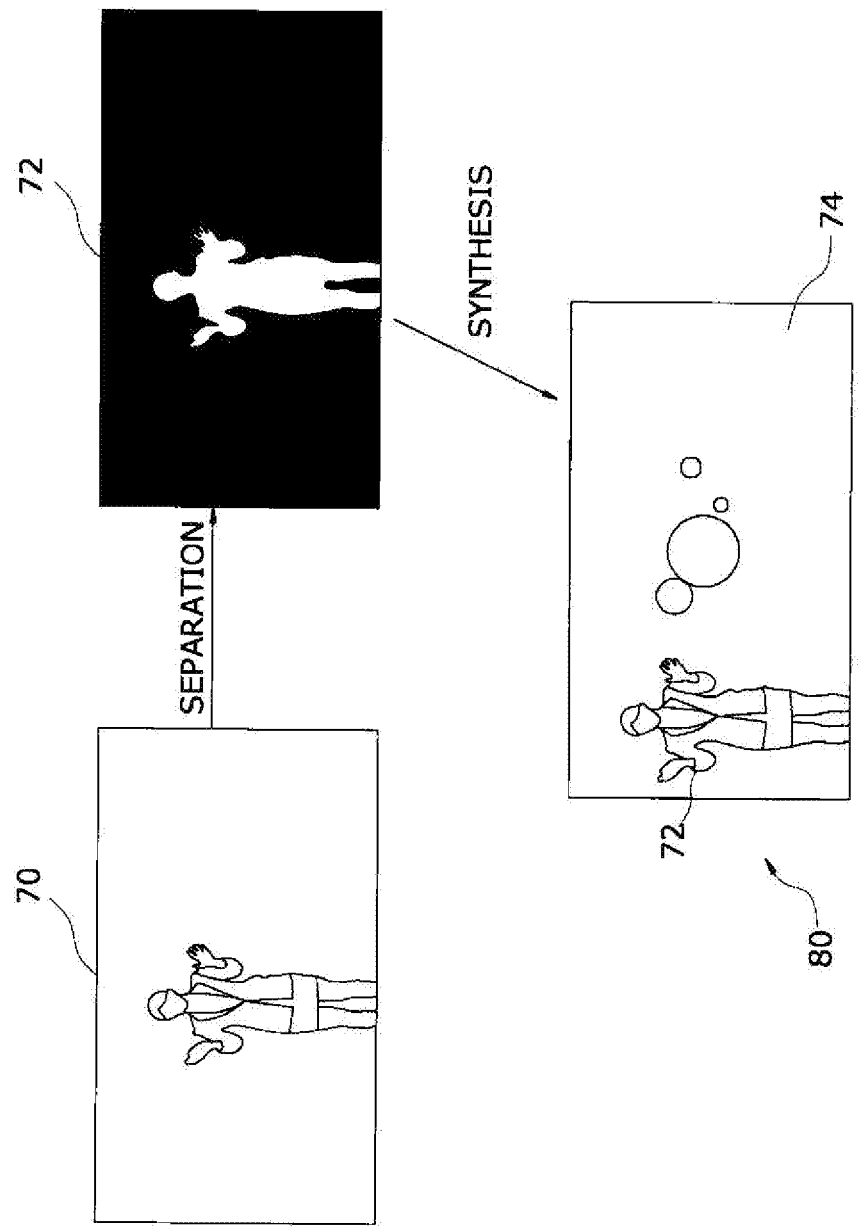

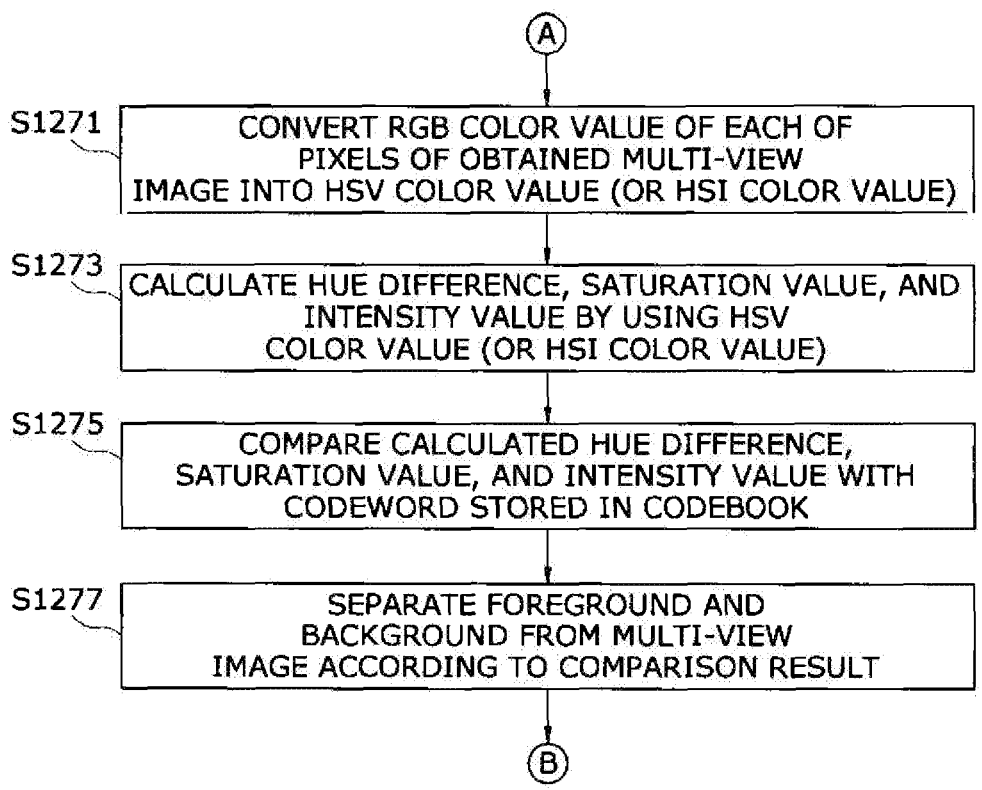

DEVICE AND METHOD OF GENERATING MULTI-VIEW IMMERSIVE CONTENT

CROSS-REFERENCE TO RELATED APPLICATIONS

This application claims priority under 35 U.S.C. § 119 to Korean Patent Application No. 10-2015-0029168, filed on Mar. 2, 2015, the disclosure of which is incorporated herein by reference in its entirety.

TECHNICAL FIELD

The present invention relates to a multi-view immersive content generating device and method, and more particularly, to a multi-view immersive content generating device and method for a glasses-free display type.

BACKGROUND

A stereoscopic image display method may be classified into a glasses type using glasses and a glasses-free type requiring no glasses.

A glasses type display method needs glasses and causes inconvenience to a user in that the user feels vertigo due to an unrealistic sense of depth. On the other hand, a glasses-free display method does not need glasses and is relatively reduced in a sense of depth, but vertigo is reduced.

For this reason, a method of displaying a stereoscopic image is expected to advance to a glasses-free type, and thus, it is required to develop technology for producing multi-view immersive content based on a glasses-free display method. However, to date, development of hardware and software for producing multi-view immersive content is incomplete.

SUMMARY

Accordingly, the present invention provides a multi-view immersive content generating device and method for a glasses-free display type.

In one general aspect, a method of generating multi-view immersive content includes: obtaining a multi-view background image from a plurality of cameras arranged in a curved shape; modeling the obtained multi-view background image to generate a codebook corresponding to the multi-view background image, obtaining a multi-view image including an object from the plurality of cameras and separating a foreground and a background from the obtained multi-view image by using the generated codebook; and synthesizing the object included in the separated foreground with a virtual background to generate multi-view immersive content.

In another general aspect, a multi-view immersive content generating device includes: a background model generator configured to model a multi-view background image obtained from a plurality of cameras arranged in a curved shape to generate a codebook corresponding to the multi-view background image; a foreground/background separator configured to separate a foreground and a background from a multi-view image obtained from the plurality of cameras by using the codebook; and a synthesizer configured to synthesize the separated foreground with a virtual background to generate multi-view immersive content.

Other features and aspects will be apparent from the following detailed description, the drawings, and the claims.

BRIEF DESCRIPTION OF THE DRAWINGS

FIG. 11 is a diagram schematically illustrating an operation of synthesizing a virtual background and a foreground separated by a synthesizer of FIG. 5.

FIG. 13 is a flowchart illustrating a detailed operation of step S1270 illustrated in FIG. 12.

DETAILED DESCRIPTION OF EMBODIMENTS

The advantages, features and aspects of the present invention will become apparent from the following description of the embodiments with reference to the accompanying drawings, which is set forth hereinafter.

However, the present invention may be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

In order to produce multi-view immersive content, production equipment which includes a background screen such as a green screen and camera equipment installed in front of the background screen may be installed in a specific shooting set. A method of producing camera equipment may be an important factor for determining the quality of multi-view immersive content.

Figure 1:
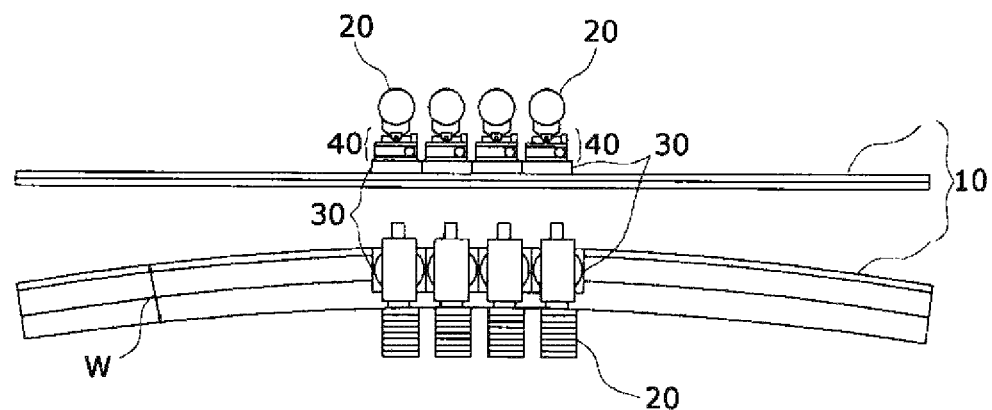
FIG. 1 is a diagram illustrating production equipment for producing multi-view immersive content according to an embodiment of the present invention.
Figure 2:
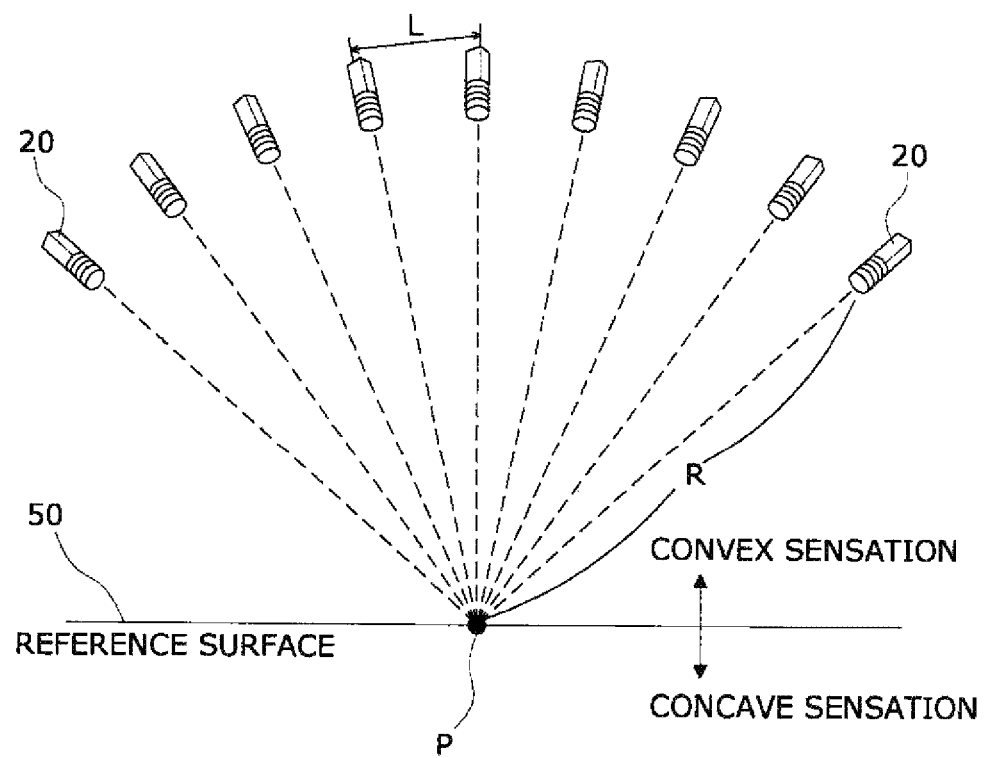
FIG. 2 is a diagram for describing an arrangement form of camera equipment illustrated in FIG. 1.
Figure 3:
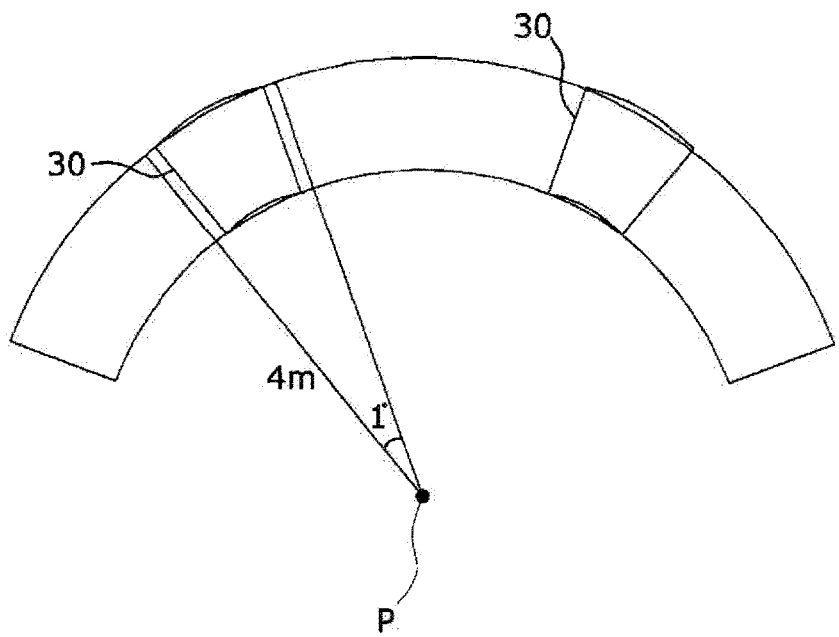
FIG. 3 is a diagram for describing a shape of a cradle illustrated in FIG. 1.
Figure 4:
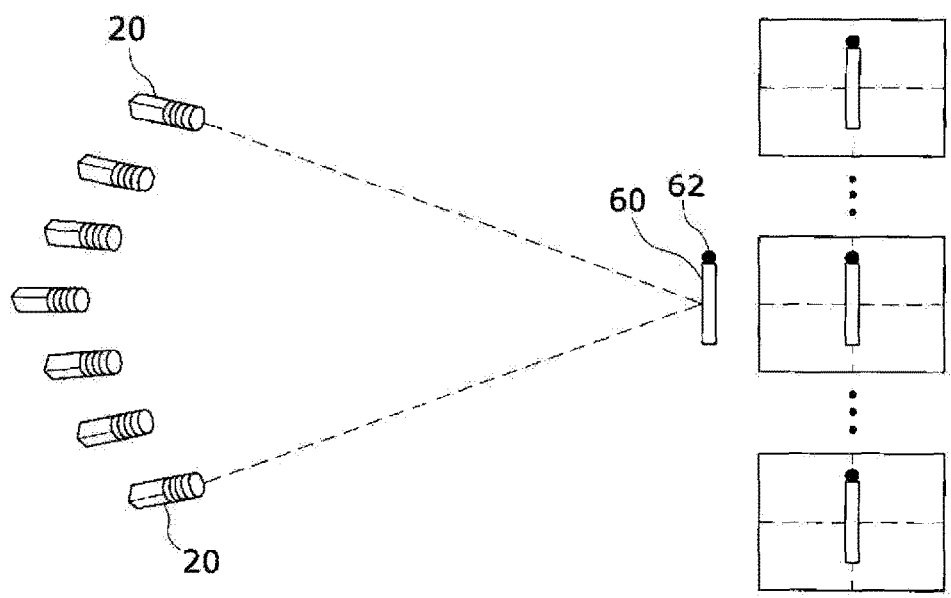
FIG. 4 is a diagram for describing the control of a horizontal disparity of each of cameras illustrated in FIG. 1.

FIG. 1 is a diagram illustrating camera equipment for producing multi-view immersive content according to an embodiment of the present invention. FIG. 2 is a diagram for describing an arrangement form of camera equipment illustrated in FIG. 1. FIG. 3 is a diagram for describing a size of a cradle illustrated in FIG. 1. FIG. 4 is a diagram for describing adjustment of a focus of each of cameras illustrated in FIG. 1.

Referring to FIGS. 1 and 2, the camera equipment for producing multi-view immersive content according to an embodiment of the present invention may include a guide rail 10 and a plurality of cameras 20.

The cameras may be arranged in a spherical shape or a curved shape which has a radius R with respect to a convergence point P at which an object is located. An arrangement structure of the cameras may be a convergence-type arrangement structure.

Due to the convergence-type arrangement structure, the guide rail 10 on which the plurality of cameras 20 are installed may have a spherical shape or a curved shape.

When a plane including the convergence point P corresponding to a reference is a reference surface 50, a region between each of the cameras 20 and the reference surface 50 may be defined as a convex sensation region which expresses a convex sensation in a multi-view monitor. A region opposite to the convex sensation region with respect to the reference surface 50 may be defined as a concave sensation region that expresses a concave sensation in the multi-view monitor.

The cameras 20 may be arranged in a spherical shape or a curved shape to be spaced apart from each other by a certain separation distance L.

The radius R and the separation distance L may be important variables for determining the quality of multi-view immersive content.

An accurate numerical value of each of the radius R and the separation distance L is not defined in a multi-view immersive content producing operation using a content producing tool based on a virtual camera, in addition to a multi-view immersive content producing operation using an actual camera and thus may be determined based on an experience of a designer who produces content.

In an embodiment of the present invention, the radius R may be set to 4 m, and in this case, a width of the guide rail 10 may be set to 8 cm.

In order to arrange the cameras 20 on the guide rail 10 having a spherical shape or a curved shape, each of the cameras 20 may be disposed on the guide rail 30 and may be fixedly installed on a cradle 30 including a curved-shape groove which is movably formed in a lower surface of the guide rail 30.

An adjustment unit 40 that enables each of the cameras 20 to be moved in up, down, left, and right directions may be disposed between the cradle 30 and each of the cameras 20.

When seen from a top, as illustrated in FIG. 3, the cradle 30 may be manufactured in a fan shape having a one-degree arc length with respect to a radius of 4 m. In this case, an interval and interference between cameras are minimized.

Since such camera equipment causes an error in a production operation and an installation operation, all equipment may be installed, and then, focuses of cameras may be adjusted in order for an object located at a convergence point to be located on central focuses of all the cameras.

To this end, as illustrated in FIG. 4, a focus of each of cameras may be adjusted by using a focus adjustment object where a spherical thing 62 is located on a cylindrical body 60.

In detail, the focus adjustment object may be disposed at a convergence point, and then, each camera may be moved in up, down, left, and right directions in order for the focus adjustment object to be located on a focus seen from each camera. When focuses of all the cameras are adjusted, installation of camera equipment for producing multi-view immersive content may be completed.

When installation of the camera equipment is completed, the camera equipment may photograph an object for producing multi-view immersive content to capture an image, and a processing operation of separating a foreground and a background from the captured image may be performed for extracting an object from the captured image.

The processing operation may be performed by a computing device electrically connected to the camera equipment of FIG. 1.

Figure 5:
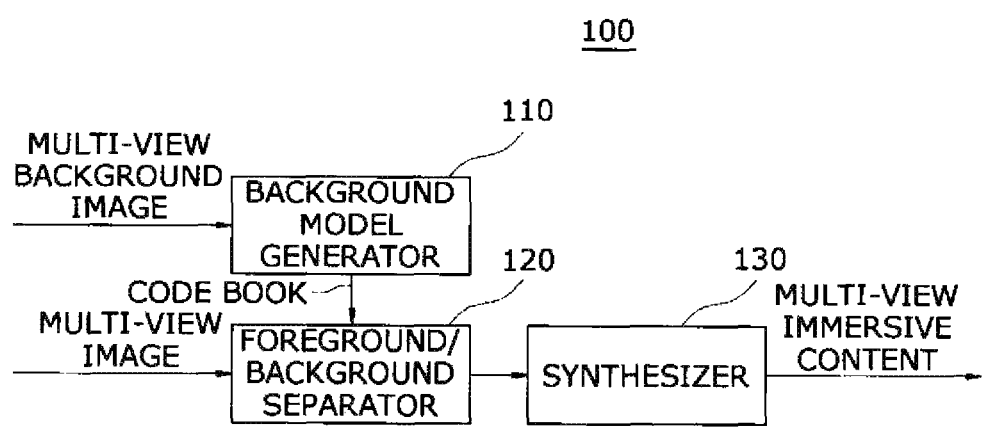
FIG. 5 is a block diagram illustrating a computing device for producing multi-view immersive content according to an embodiment of the present invention.

FIG. 5 is a block diagram illustrating a computing device 100 for producing multi-view immersive content according to an embodiment of the present invention.

For conciseness of the drawing, elements such as an interface, a central processing unit (CPU), a memory, and a system bus, connecting the elements, which are fundamentally included in the computing device 100 are not illustrated. In FIG. 5, only three blocks 110, 120 and 130 corresponding to a foreground and background separation operation divided by a unit of processing are illustrated. The three blocks 110, 120 and 130 may be implemented into one chip, which may be equipped in the CPU.

The computing device 100 for producing multi-view immersive content according to an embodiment of the present invention may separate a foreground and a background from an image according to a codebook algorithm and may synthesize the separated foreground (i.e., a separated object) with a virtual background or a virtual object to generate multi-view immersive content.

To this end, the computing device 100 according to an embodiment of the present invention may include a background model generator 110, a foreground/background separator 120, and a synthesizer 130.

The background model generator 110 may extract a codebook from each of pixels of a multi-view background image (for example, N number of multi-view background images) obtained from a camera and may generate the extracted codebook as a background model.

A codebook extracted from an arbitrary pixel may include a plurality of codeword values.

A mean of color values which are collected for the arbitrary pixel in units of a frame may be stored in each of the codeword values. Here, the color values "$hsv_1$" may be values which are expressed in a hue, saturation, and intensity (HSI) color space (an HSI color model) or a hue, saturation, and value (HSV) color space (an HSV color model).

Moreover, a lowest intensity value "$I_{low}$" and a highest intensity value "$I_{high}$" among intensity values which are collected for the arbitrary pixel in units of a frame may be stored in each of the codeword values.

When a multi-view background image corresponding to N number of frames is collected for a background model, a color value "$hsv_1$" of each of pixels of a multi-view background image of a first frame may be stored in one codeword.

The background model generator 110 may compare all codewords which are generated in a corresponding pixel up to date in each of second to Nth frames, and when similar codewords are found, the background model generator 110 may update a corresponding codeword. On the other hand, when there are no similar codewords, the background model generator 110 may perform a background modeling operation by generating a new codeword.

The foreground/background separator 120 may collect a color value corresponding to each of pixels of a multi-view image input from the plurality of cameras 20. Here, the color value may be an HSI or HSV color value generated by converting a red, green, and blue (RGB) color value through a color space conversion operation.

The foreground/background separator 120 may determine a similarity between the collected HSI or HSV color value and a codeword value stored in a codebook extracted by the background model generator 110, and when the similarity is high, the foreground/background separator 120 may determine a corresponding pixel as a background. On the other hand, when the similarity is low, the foreground/background separator 120 may determine the corresponding pixel as a foreground. Such a foreground and background separation operation will be described below in detail.

The synthesizer 130 may synthesize an object, included in the foreground separated by the foreground/background separator 120, with a virtual object, a virtual background, or a virtual background including the virtual object to generate the multi-view immersive content.

Hereinafter, a foreground and background separation operation performed by the foreground/background separator 120 will be described in detail with reference to FIG. 6.

Figure 6:
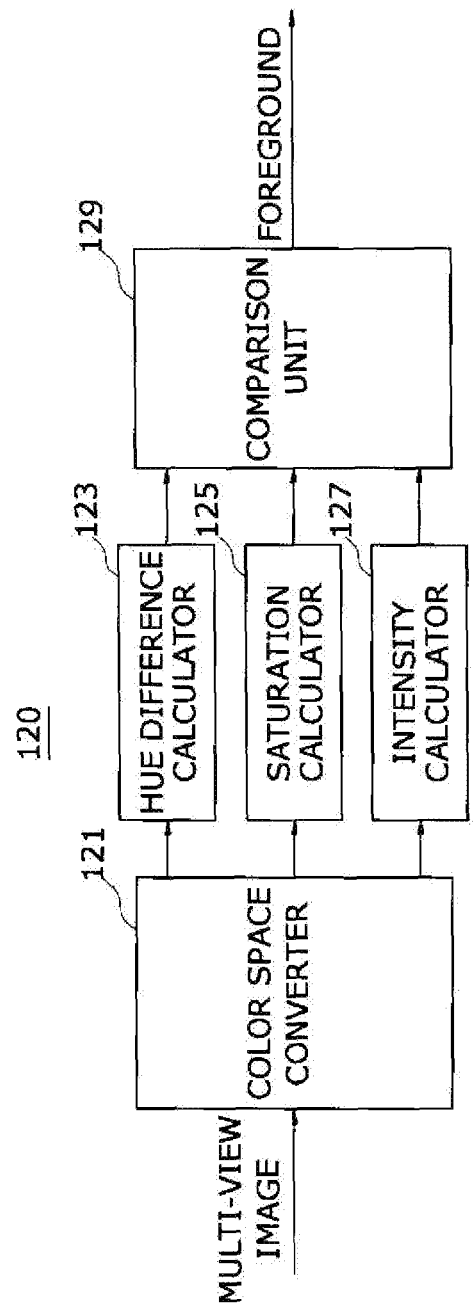
FIG. 6 is a detailed block diagram of a foreground/background separator illustrated in FIG. 5.

FIG. 6 is a detailed block diagram of the foreground/background separator 120 illustrated in FIG. 5.

Referring to FIG. 6, as described above, the foreground/background separator 120 according to an embodiment of the present invention may determine a similarity between an HSI color value (or an HSV color value) and a codeword value stored in a codebook which is extracted through a background model generation operation performed by the background model generator 110, and may separate a foreground and a background from an image, based on the determined similarity.

To this end, the foreground/background separator 120 may include a color space converter 121, a hue difference calculator 123, a saturation calculator 125, an intensity calculator 127, and a comparison unit 129.

The color space converter 121 may convert a color space of a multi-view image input from the plurality of cameras 20 installed as illustrated in FIG. 1. Here, the multi-view image may differ from a multi-view background image in that the multi-view image is an image obtained by photographing an object used to produce multi-view immersive content.

In detail, the color space converter 121 may convert a color value of each of pixels of the multi-view image, expressed in an RGB color space, into an HSI color value (or an HSV color value) expressed in an HSI color space (or an HSV color space). Here, the color value may be scalar. The scalar may be expressed as a color vector in a color space. When the HSI color value (or the HSV color value) is expressed in a vector form, the HSI color value (or the HSV color value) may have a coordinate value with a hue (H) value, a saturation (S) value, and an intensity (I or V) value as coordinates in the color space. In the present specification, unless special description is made, a color value and a color vector may be construed as the same meaning.

The hue difference calculator 123 may calculate a hue difference between an HSI (or HSV) color value "$hsv_1$", stored in a codeword extracted through a background modeling operation performed by the background model generator 110, and an HSI (or HSV) color value "$hsv_2$" of an arbitrary pixel input from the color space converter 121.

The saturation calculator 125 may calculate a corrected saturation value by dividing a saturation value "I", included in the HSI color value (or the HSV color value) of the arbitrary pixel input from the color space converter 121, by a maximum saturation value "$I_{max}$" capable of being expressed in an HSI color space (or an HSV color space).

The intensity calculator 127 may collect, by a frame unit, intensity (V or I) values included in the HSI color value (or the HSV color value) of the arbitrary pixel input from the color space converter 121 and may apply a weight variable ($\alpha$, $\beta$) to a lowest intensity value "$I_{low}$" and a highest intensity value "$I_{high}$" among the collected intensity (V or I) values to calculate a corrected intensity value (an intensity boundary).

A calculation operation performed by each of the calculators 123, 125 and 127 will be described below in detail.

The comparison unit 129 may compare the hue difference, the corrected saturation value, and the corrected intensity value respectively calculated by the calculators 123, 125 and 127 with a codeword stored in a codebook provided from the background model generator 110, and when a difference obtained through the comparison is less than a threshold value, the comparison unit 129 may determine corresponding pixels as a background. On the other hand, when the difference is greater than the threshold value, the comparison unit 129 may determine the corresponding pixels as a foreground. In this way, a comparison determination operation of separating a foreground and a background may be performed.

As described above, when the foreground and the background are separated from an image, the separated foreground may be transferred to the synthesizer 130, and the synthesizer 130 may synthesize an object included in the foreground with a virtual object, a virtual background, or a virtual background including the virtual object, thereby finally producing multi-view immersive content.

Hereinafter, the calculation operation performed by each of the calculators 123, 125 and 127 will be described in detail.

Hue Difference "D" Calculation

In an embodiment of the present invention, an HSI color model (or an HSV color model) may be used for separating a foreground and a background.

A hue and a saturation among the hue, the saturation, and intensity which configure an HSI color model (or an HSV color model) may each have a relative value, such as an angle or a ratio "%", instead of a quantitative absolute value.

Therefore, in a case of comparing a multi-view image with a multi-view background image which is modeled for separating a foreground and a background, a difference between an RGB color value of the multi-view background image and an RGB color value of a multi-view image is not large in an RGB color model, but in an HSI color model (or an HSV color model), a difference between an HSI color value (or an HSV color value) corresponding to the RGB color value of the multi-view background image and an HSI color value (or an HSV color value) corresponding to the RGB color value of the multi-view image is large.

Particularly, in the HSI color model (or the HSV color model), as a color value of an arbitrary pixel becomes closer to a center axis (i.e., an intensity axis) for classifying an achromatic color, a difference between a hue and a saturation becomes larger. Such a problem causes an error in an operation of separating a foreground and a background.

For example, when it is assumed that two RGB color values compared for separating a foreground and a background are RGB(1,1,0) and RGB(1,1,1), a distance value between the RGB(1,1,0) and the RGB(1,1,1) may be I in the RGB color model, and thus, a person's eyes may recognize all the two RGB color values as black.

However, in a case where the two RGB color values are converted into an HSI color, a saturation of the RGB(1,1,0) may be calculated as 100%, and a saturation of the RGB(1, 1,1) may be calculated as 0%. Therefore, when two HSI color values converted into an HSI color model are applied to the codebook algorithm, two colors may be determined as different colors, and thus, an error occurs in separating a foreground and a background.

That is, a case of separating a foreground and a background with an HSI color model (or an HSV color model) has a problem in that as intensity becomes lower, a change degree of each of a color and a saturation is larger than a visually recognized color difference.

Therefore, in an embodiment of the present invention, a concept of a color difference may be introduced in order to prevent an error from occurring in an operation of separating a foreground and a background based on an HSI model (or an HSV model), namely, in order for a difference of two colors compared in an RGB model to be reflected in the HSI model (or an HSV model) as-is.

Figure 7:
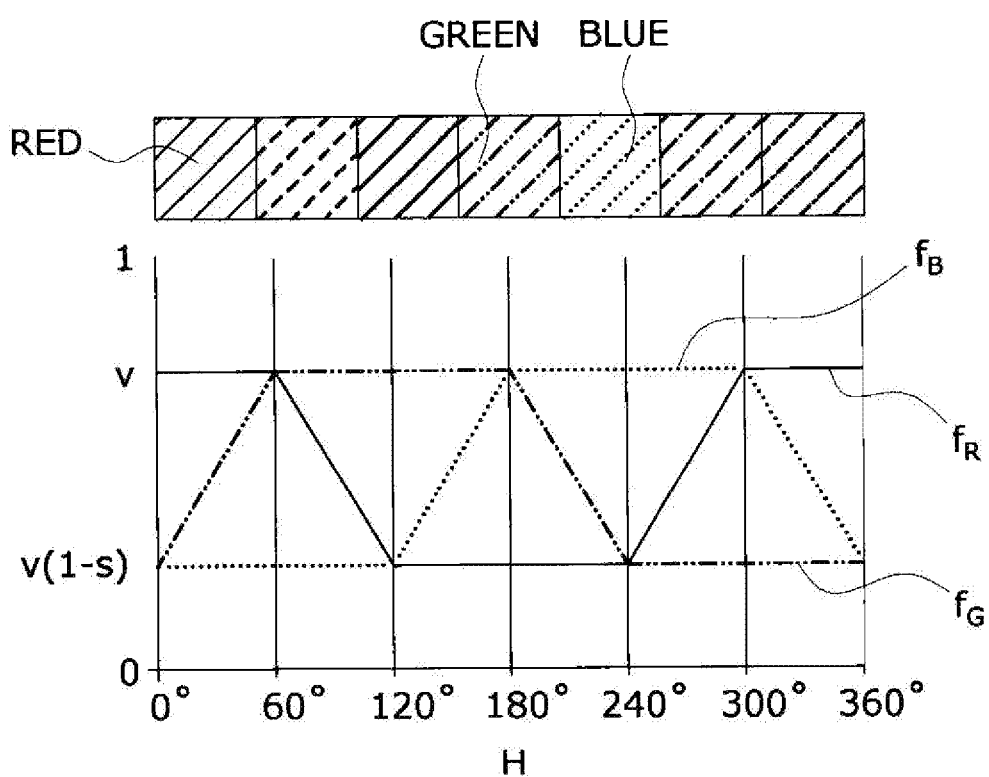
FIG. 7 is an HSV-RGB spectrum graph applied to an embodiment of the present invention.

FIG. 7 is an HSV-RGB spectrum graph for describing a concept of a hue difference applied to an embodiment of the present invention.

Referring to FIG. 7, the HSV-RGB spectrum graph may be a graph showing an RGB color value ($f_R$, $f_G$, $f_B$) with respect to an arbitrary HSV color value (h, s, v). In FIG. 7, the abscissa axis indicates a hue, and the ordinate axis indicates intensity.

An operation of converting the arbitrary HSV color value (h, s, v) into the RGB color value ($f_R$, $f_G$, $f_B$) for showing the RGB color value ($f_R$, $f_G$, $f_B$) with respect to the arbitrary HSV color value (h, s, v) on the HSV-RGB spectrum graph may use, for example, the following HSV to RGB equation disclosed in "Digital Image Processing" presented by Rafael C. Gonzalez:

[HSV to RGB]

$$f_R = \begin{cases} v & (\text{if } H < 60 \text{ or } 300 \le H) \\ v\left(1 - \frac{h-60}{60} \times s\right) & (\text{if } 60 \le H < 120) \\ v(1-s) & (\text{if } 120 \le H < 240) \\ v\left(1 - \frac{300-h}{60} \times s\right) & (\text{if } 240 \le H < 300) \end{cases}$$

$$f_G = \begin{cases} v\left(1 - \frac{60-h}{60} \times s\right) & (\text{if } H < 60) \\ v & (\text{if } 60 \le H < 180) \\ v\left(1 - \frac{h-180}{60} \times s\right) & (\text{if } 180 \le H < 240) \\ v(1-s) & (\text{if } 240 \le H) \end{cases}$$

-continued $$f_B = \begin{cases} v(1-s) & (\text{if } H < 120) \\ v\left(1 - \frac{180-h}{60} \times s\right) & (\text{if } 120 \le H < 180) \\ v & (\text{if } 180 \le H < 300) \\ v\left(1 - \frac{h-300}{60} \times s\right) & (\text{if } 300 \le H) \end{cases}$$

Figure 8:
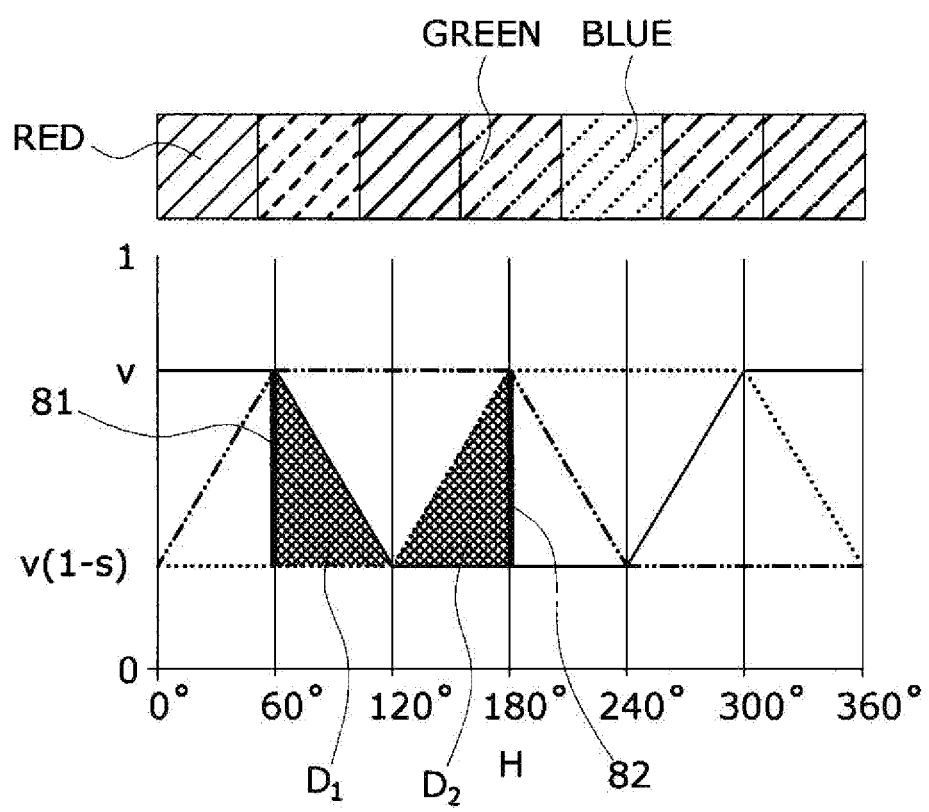
FIG. 8 is a diagram schematically showing a hue difference on the HSV-RGB spectrum graph shown in FIG. 7.

A hue difference applied to an embodiment of the present invention, as shown in FIG. 8, may be defined as an area of a triangle shown on the HSV-RGB spectrum graph.

In detail, a hue difference "D" may be defined as an area of a triangle formed between a first color value "$h_1$" of a first HSV color value ($hsv_1(h_1, s_1, v_1)$) and a second color value "$h_2$" of a second HSV color value ($hsv_2(h_2, s_2, v_2)$) on the HSV-RGB spectrum graph.

For example, as shown in FIG. 8, when the first color value "$h_1$" is 60 degrees and the second color value "$h_2$" is 180 degrees, an area "$D=D_1+D_2$" of a triangle formed between 60 degrees and 180 degrees may correspond to the hue difference "D".

Figure 9A:
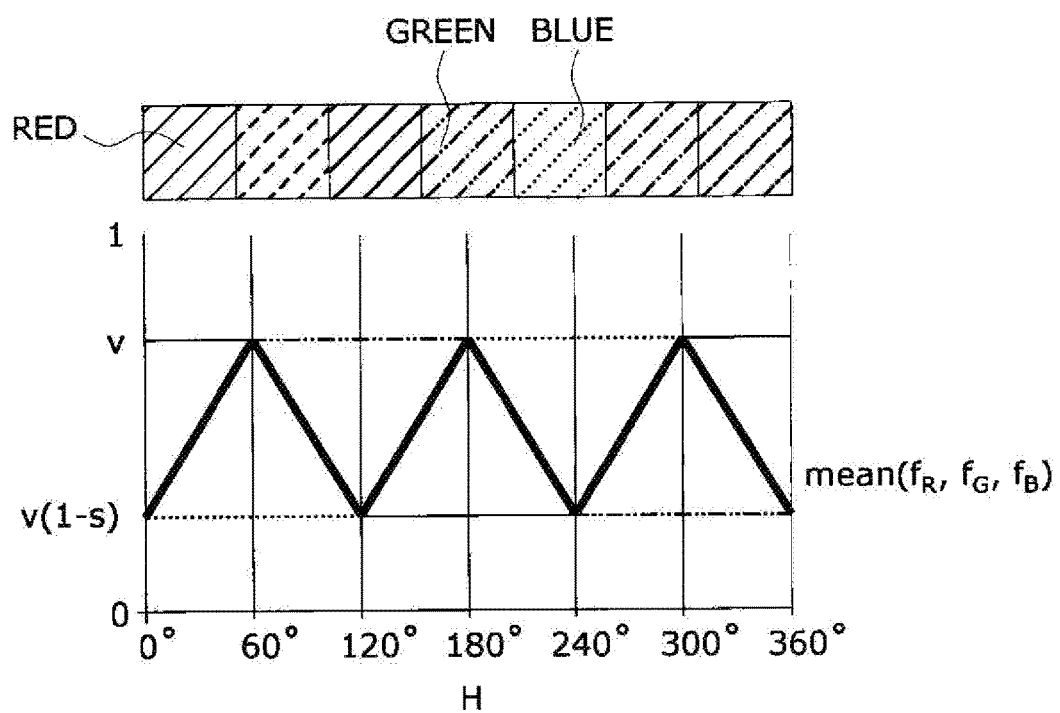
FIGS. 9A and 9B are diagrams respectively showing mean($f_R$, $f_G$, $f_B$) and min($f_R$, $f_G$, $f_B$) on the HSV-RGB spectrum graph shown in FIG. 7.
Figure 9B:
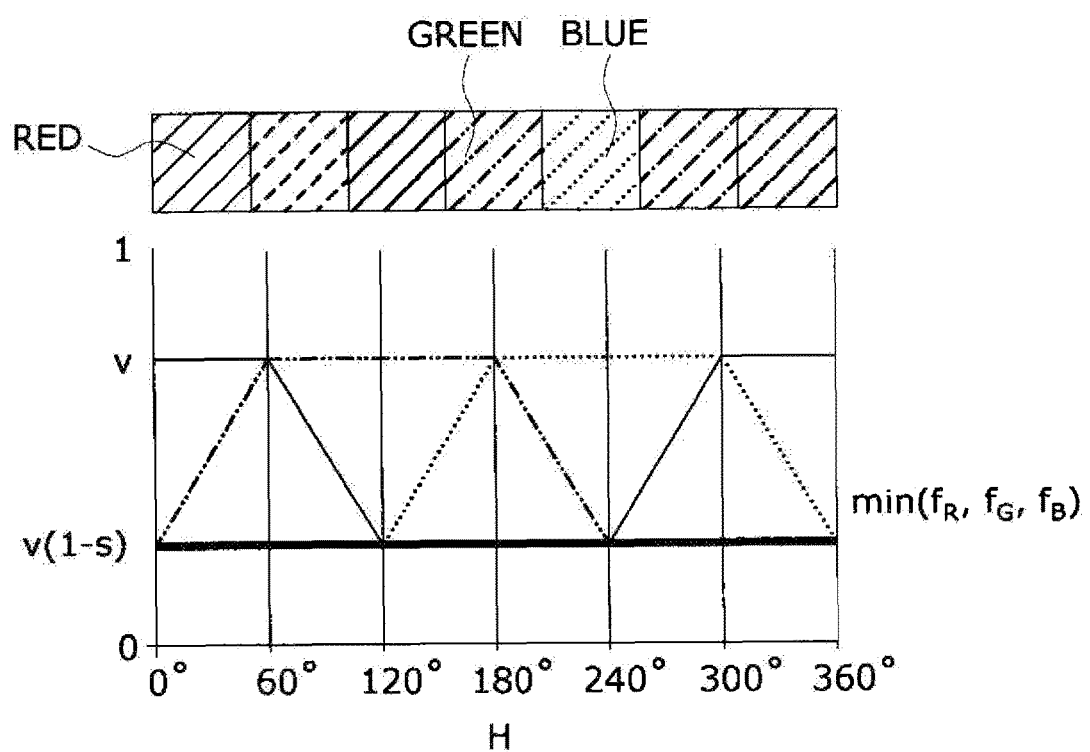

The hue difference "D" corresponding to the area of the triangle may be calculated as expressed in the following Equations (1) and (2):

$$d(h_1,s_1,v_1) = \text{mean}(f_{R1}, f_{G1}, f_{B1}) - \min(f_{R1}, f_{G1}, f_{B1})$$

$$d(h_2,s_2,v_2) = \text{mean}(f_{R2}, f_{G2}, f_{B2}) - \min(f_{R2}, f_{G2}, f_{B2}) \quad (1)$$

$$D = \frac{1}{2}\left(\int_{h_1}^{h_2} d(h_1, s_1, v_1)dh + \int_{h_1}^{h_2} d(h_2, s_2, v_2)dh\right) \quad (2)$$

where ($h_1$, $s_1$, $v_1$) denotes an HSV color value of a multi-view background image stored in a codeword, ($h_2$, $s_2$, $v_2$) denotes an HSV color value of a multi-view image compared with the HSV color value stored in the codeword for separating a foreground and a background, mean($f_{R1}$, $f_{G1}$, $f_{B1}$) denotes an intermediate value of an RGB color value ($f_{R1}$, $f_{G1}$, $f_{B1}$) of a multi-view background image shown on the HSV-RGB spectrum graph, mean($f_{R2}$, $f_{G2}$, $f_{B2}$) denotes an intermediate value of an RGB color value ($f_{R2}$, $f_{G2}$, $f_{B2}$) of a multi-view image compared with the HSV color value ($h_1$, $s_1$, $v_1$), min($f_{R1}$, $f_{G1}$, $f_{B1}$) denotes a minimum value of the RGB color value ($f_{R1}$, $f_{G1}$, $f_{B1}$) of the multi-view background image shown on the HSV-RGB spectrum graph, and min($f_{R2}$, $f_{G2}$, $f_{B2}$) denotes a minimum value of the RGB color value ($f_{R2}$, $f_{G2}$, $f_{B2}$) of the multi-view image compared with the HSV color value ($h_1$, $s_1$, $v_1$). Here, in a case where mean($f_R$, $f_G$, $f_B$) is shown on the HSV-RGB spectrum graph, mean($f_R$, $f_G$, $f_B$) may be illustrated as a thick solid line in FIG. 9A, and in a case where min($f_R$, $f_G$, $f_B$) is shown on the HSV-RGB spectrum graph, min($f_R$, $f_G$, $f_B$) may be illustrated as a thick solid line in FIG. 9B. Each of d($h_1$, $s_1$, $v_1$) and d($h_2$, $s_2$, $v_2$) denotes a height of a triangle formed between a first hue value "$h_1$" and a second hue value "$h_2$", d($h_1$, $s_1$, $v_1$) denotes a height of a triangle "$D_1$" referred to by reference numeral "81" of FIG. 8, and d($h_2$, $s_2$, $v_2$) denotes a height of a triangle "$D_2$" referred to by reference numeral "82" of FIG. 8.

According to Equations (1) and (2), a height ($D_1$, $D_2$) of a triangle may be changed depending on a saturation "s" and intensity "v", and thus, if a difference between $h_1$ and $h_2$ is large but a saturation or intensity is very low, a hue difference may be calculated as a small value.

Due to such a calculation result, when a foreground an a background are separated from an image by using an HSI color model (or an HSV color model), an error is prevented from occurring in a foreground and background separation operation due to a problem in which as intensity becomes lower, a change amount of a hue "H" is larger than a color difference which is visually recognized.

Saturation Calculation

In an operation of separating a foreground and a background by using an HSI color model (or an HSV color model), in order to solve a problem where a change amount of a saturation is large, the saturation calculator 125 illustrated in FIG. 6 may calculate a saturation "S" by using the following Equations (3) to (5):

$$l = \sqrt{\|\vec{v}\|^2 - \frac{(\vec{v}\cdot\vec{u})^2}{\|\vec{u}\|^2}} \quad (3)$$

$$l_{max} = \sqrt{\|\vec{v_{max}}\|^2 - \frac{(\vec{v_{max}}\cdot\vec{u})^2}{\|\vec{u}\|^2}} \quad (4)$$

$$S = l/l_{max} (0 \le S \le 1) \quad (5)$$

where $\vec{u}$ denotes a unit vector of a straight line "A" which is expressed in an achromatic color in an RGB color space, $\vec{v}$ denotes a color vector indicating the arbitrary pixel in the RGB color space or denotes a color vector indicating the arbitrary pixel in the HSI color space (or an HSV color space), $l(0 \le l \le l_{max})$ denotes a vertical distance from coordinates of $\vec{v}$ to the straight line in the RGB color space or denotes a vertical distance from the coordinates of $\vec{v}$ to the center axis in the HSI color space, and $\vec{v}_{max}$ denotes a vector having $l_{max}$.

Figure 10A:
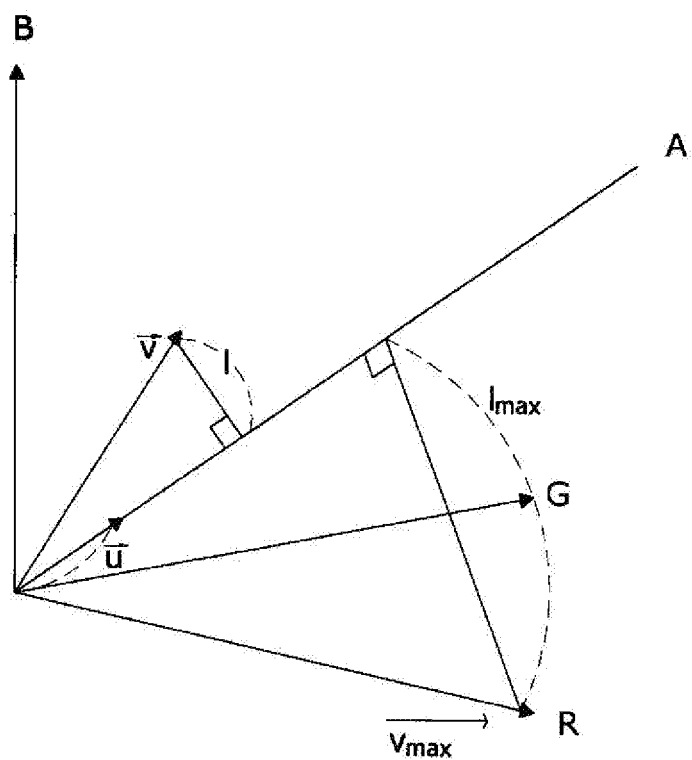
FIG. 10A is a diagram schematically showing variables I and $I_{max}$ of Equation (5) in an RGB color space (or an RGB color model) according to an embodiment of the present invention.
Figure 10B:
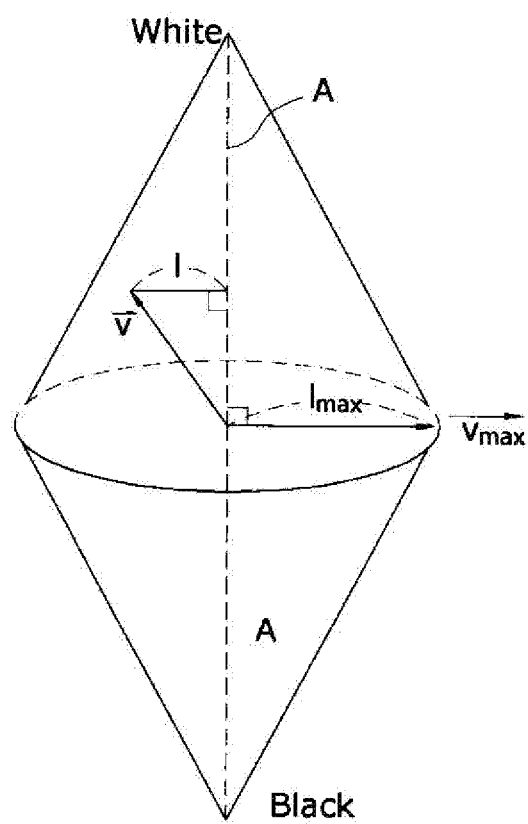
FIG. 10B is a diagram schematically showing variables I and $I_{max}$ of Equation (5) in an HSV color space (or an HSV color model) according to an embodiment of the present invention.

As expressed in Equation (5), the calculated saturation "S" may be redefined as a range of $0 \le S \le 1$ by dividing a vertical distance from an end point (r, g, b) of the vector "$\vec{v}$" to the straight line "A" located on the unit vector "$\vec{u}$" by a maximum saturation value "$l_{max}$" of an arbitrary pixel in the HSI color space as schematically illustrated in FIGS. 10A and 10B. Accordingly, an error is prevented from occurring in a foreground and background separation operation due to a problem in which as intensity becomes lower, a change amount of a hue "H" is larger than a color difference which is visually recognized.

Intensity Calculation

An intensity calculation operation performed by the intensity calculator 127 of FIG. 6 according to an embodiment of the present invention may be calculated as expressed in the following Equation (6):

$$\text{Intensity boundary} = \left[\max\{\alpha I_{high}, \tau_{black}\}, \max\left\{\min\left\{\beta I_{high}, \frac{I_{low}}{\alpha}\right\}, \tau_{black}\right\}\right] \quad (6)$$

where $I_{high}$ denotes a highest intensity value among intensity values of pixels which are collected in units of one frame, $I_{low}$ denotes a lowest intensity value among the intensity values of the pixels which are collected in units of one frame, $\alpha$ and $\beta$ ($\alpha < \beta$) denote weight variables determined based on a user input, and $\tau_{black}$ denotes a threshold value that is set in order for an intensity boundary value not to be excessively reduced.

An intensity calculation operation based on Equation (6) may apply the weight variables "$\alpha$ and $\beta$" to an intensity value of an arbitrary pixel in the HSI color space (or the HSV color space). In this case, when intensity is very low, a calculated intensity boundary value may be adjusted by setting the threshold value "$\tau_{black}$" so as not to be excessively reduced.

A hue difference "D", a saturation value "S", and an intensity value (an intensity boundary) "I" which are calculated for an arbitrary pixel according to Equations (2), (5) and (6) may be compared with a codeword stored in a codebook extracted through a background modeling operation.

As a result of three comparisons, when all differences are less than a threshold value, the arbitrary pixel may be determined as a background, and when all the differences are greater than the threshold value, the arbitrary pixel may be determined as a foreground, thereby separating the foreground and the background from a multi-view image.

As illustrated in FIG. 11, a foreground 72 separated from a multi-view image 70 may be transferred to the synthesizer 130 of FIG. 5, and the synthesizer 130 may extract an object included in the foreground and may synthesize the extracted object with a virtual background 74 to generate multi-view immersive content 80.

Figure 12:
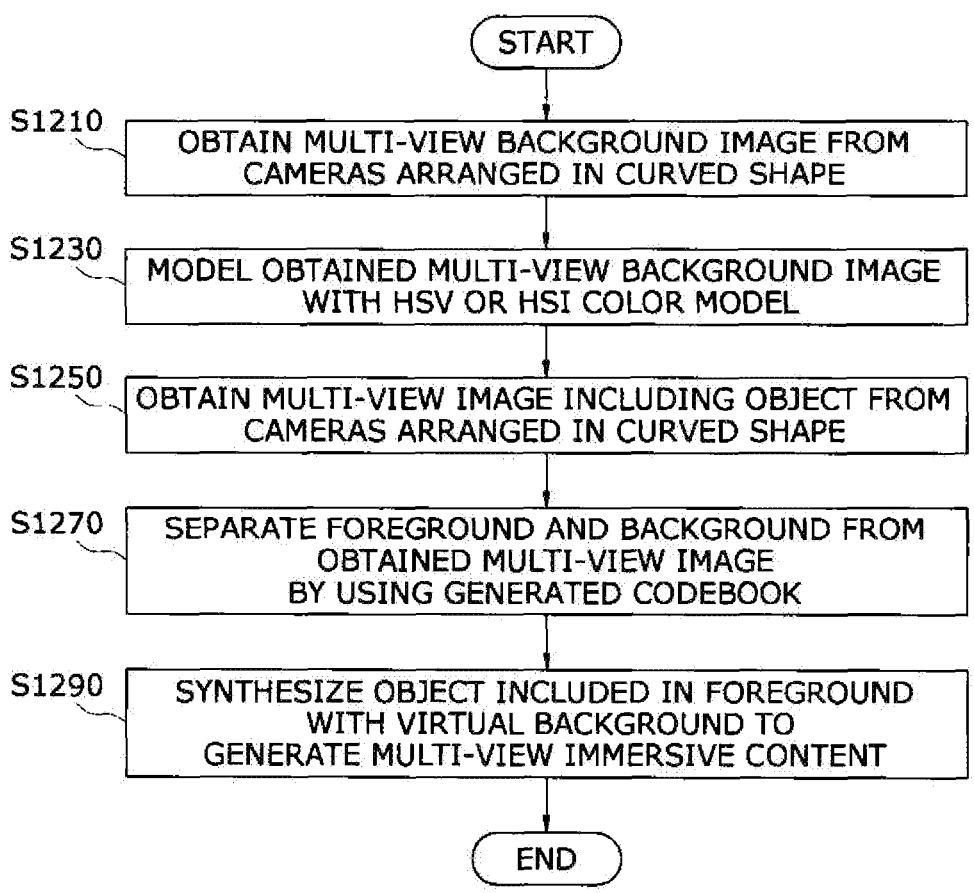
FIG. 12 is a flowchart illustrating an operation of producing multi-view immersive content according to an embodiment of the present invention.

FIG. 12 is a flowchart illustrating an operation of producing multi-view immersive content according to an embodiment of the present invention. FIG. 13 is a flowchart illustrating a detailed operation of step S1270 illustrated in FIG. 12.

Referring to FIG. 12, first, a multi-view immersive content generating device according to an embodiment of the present invention may obtain a multi-view background image from a plurality of cameras which are arranged in a curved shape in step S1210. Before step S1210 is performed, a curved-shape guide rail may be installed to form a certain radius "R" with respect to a convergence point at which an object is located, and the plurality of cameras may be arranged at certain intervals "L" on the installed guide rail.

Subsequently, in step S1230, the multi-view immersive content generating device may model the obtained multi-view background image into an HSV or HSI color model.

Subsequently, in step S1250, the multi-view immersive content generating device may obtain a multi-view image including an object from the plurality of cameras which are arranged in a curved shape.

Subsequently, in step S1270, the multi-view immersive content generating device may separate a foreground and a background from the obtained multi-view image by using the generated codebook. In detail, referring to FIG. 13, the multi-view immersive content generating device may convert an RGB color value of each of pixels of the obtained multi-view image into an HSV color value (or an HSI color value) in step S1271. Subsequently, in step S1273, the multi-view immersive content generating device may calculate a hue difference "D", a saturation value "S", and an intensity value "V or I" by using the HSV color value (or the HSI color value), based on Equations (1) to (6). Subsequently, the multi-view immersive content generating device may compare the hue difference "D", the saturation value "S", and the intensity value "V or I" with a codeword stored in a codebook in step S1275, and may separate the foreground and the background from the multi-view image according to a result of the comparison in step S1277.

Referring again to FIG. 12, in step S1290, the multi-view immersive content generating device may synthesize an object, included in the foreground which is separated from the multi-view image in steps S1271 to S1277, with a virtual background or a virtual object to generate multi-view immersive content in step S1290.

According to the embodiments of the present invention, a foreground and a background may be separated from an image, obtained from cameras which are arranged in a curved shape, in real time by using the codebook algorithm, and a multi-view immersive content for a glasses-free display method may be produced by synthesizing the separated foreground with a virtual background.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating multi-view immersive content, the method comprising:
    obtaining a multi-view background image from a plurality of cameras arranged in a curved shape;
    modeling the obtained multi-view background image to generate a codebook corresponding to the multi-view background image;
    obtaining a multi-view image including an object from the plurality of cameras and separating a foreground and a background from the obtained multi-view image by using the generated codebook; and
    synthesizing the object included in the separated foreground with a virtual background to generate multi-view immersive content,
    wherein the separating of the foreground and the background comprises:
    converting an RGB color value of the multi-view image into an HSV color value expressed in an HSV color space;
    calculating a hue difference between a first HSV color value of the multi-view background image and a second HSV color value of the multi-view image which are stored in the codebook; and
    comparing the calculated hue difference with a threshold value to separate the foreground and the background from the multi-view image, and
    wherein the calculating of the hue difference comprises calculating an area of a triangle formed between a first hue value of the first HSV color value and a second hue value of the second HSV color value on an RGB-HSV spectrum graph that includes an abscissa axis indicating a hue and an ordinate axis indicating intensity.

2. The method of claim 1, wherein the obtaining of the multi-view background image comprises obtaining the multi-view background image from the plurality of cameras, arranged on a curved-shape rail that forms a certain radius with respect to a convergence point at which the object is located.

3. The method, of claim 1, wherein the calculating of the area of the triangle comprises calculating the area of the triangle according to Equations (1) and (2):

$$d(h,s,v) = \text{mean}(f_R, f_G, f_B) - \min(f_R, f_G, f_B) \quad (1)$$

where $f_R$, $f_G$, an $f_B$ each denotes an RGB color value corresponding to an arbitrary HSV color value, mean$(f_R, f_G, f_B)$ denotes an intermediate intensity value of a maximum intensity value and a minimum intensity value the RGB color value shown on the HSV-RGB spectrum graph, and $\min(f_R, f_G, f_B)$ denotes the minimum intensity value of the RGB color value, $$D = \frac{1}{2}\left(\int_{h_1}^{h_2} d(h_1, s_1, v_1)dh + \int_{h_1}^{h_2} d(h_2, s_2, v_2)dh\right) \quad (2)$$

where $d(h_1, s_1, v_1)$ denotes a difference between the maximum intensity value and minimum intensity value in the first hue value, and $d(h_2, s_2, v_2)$ denotes a difference between the maximum intensity value and minimum intensity value in the second hue value.

4. The method of claim 1, wherein the separating of the foreground and the background comprises:
    converting an RGB vector of each of pixels of the multi-view image into an HSI vector in a cone-shaped HSI color space with intensity as a center axis;
    calculating an intensity boundary value by applying a weight variable to an intensity value of an arbitrary pixel in the HSI color space; and
    comparing the calculated intensity boundary value with a threshold value stored in the codebook to separate the foreground and the background from the multi-view image.

5. The method of claim 4, wherein the calculating of the intensity boundary value comprises calculating the intensity boundary value according to Equation (6):

$$\text{Intensity boundary} = \Big[\max\{\alpha I_{high}, \tau_{black}\}, \quad (6)$$
$$\max\{\min\{\beta I_{high}, \frac{I_{low}}{\alpha}\}, \tau_{black}\}\Big]$$

where $I_{high}$ denotes a highest intensity value among intensity values of pixels which are collected in units of one frame, $I_{low}$ denotes a lowest intensity value among the intensity values of the pixels which are collected in units of one frame, $\alpha$ and $\beta(\alpha<\beta)$ each denote the weight variable determined based on a user input, and $\tau_{black}$ denotes a minimum threshold value of the intensity boundary value.

6. A method of generating multi-view immersive content, the method comprising:
    obtaining a multi-view background image from a plurality of cameras arranged in a curved shape;
    modeling the obtained multi-view background image to generate a codebook corresponding to the multi-view background image;
    obtaining a multi-view image including an object from the plurality of cameras and separating a foreground and a background from the obtained multi-view image by using, the generated codebook; and
    synthesizing the object included in the separated foreground with a virtual background to generate multi-view immersive content,
    wherein the separating of the foreground and the background comprises:
    converting an RGB color value of each of pixels of the multi-view image into an HSI color value in a cone-shaped HSI color space with intensity as a center axis;

calculating a corrected saturation value by dividing a saturation value of an arbitrary pixel in the HSI color space by a maximum saturation value expressible in the HSI color space; and comparing the corrected saturation value with the saturation value of the arbitrary pixel stored in the codebook to separate the foreground and the background from the multi-view image.

7. The method of claim 6, wherein the calculating of the corrected saturation value comprises calculating the corrected saturation value according to Equations (3) to (5);

$$l = \sqrt{\|\vec{v}\|^2 - \frac{(\vec{v}\cdot\vec{u})^2}{\|\vec{u}\|^2}} \tag{3}$$

$$l_{max} = \sqrt{\|\overrightarrow{v_{max}}\|^2 - \frac{(\overrightarrow{v_{max}}\cdot\vec{u})^2}{\|\vec{u}\|^2}} \tag{4}$$

$$S = l/l_{max} (0 \le S \le 1) \tag{5}$$

where $\vec{u}$ denotes a unit vector of a straight line which is expressed in an achromatic color in an RGB color space, $\vec{v}$ denotes a color vector indicating the arbitrary pixel in the RGB color space or denotes a color vector indicating the arbitrary pixel in the HSI color space, $l(0 \le l \le l_{max})$ denotes a vertical distance from coordinates of $\vec{v}$ to the straight line in the RGB color space or, denotes a vertical distance from the coordinates of $\vec{v}$ to the center axis in the HSI color space, and $\overrightarrow{v_{max}}$ denotes a vector having $l_{max}$.

8. A multi-view immersive content generating device comprising:

a background model generator configured to model a multi-view background image obtained from a plurality of cameras arranged in a curved shape to generate a codebook corresponding to the multi-view background image;

a foreground/background separator configured to separate a foreground and a background from a multi-view image obtained from the plurality of cameras by using the codebook; and a synthesizer configured to synthesize the separated foreground with a virtual background to generate multi-view immersive content, wherein the foreground/background separator comprises:

a color spacer converter configured to convert an RGB color value of the multi-view image into an HSV color value expressed in an HSV color space;

a hue difference calculator configured to calculate a hue difference between a first HSV color value of the multi-view background image and a second HSV color value of the multi-view image which are stored in the codebook; and a comparison unit configured to compare the calculated hue difference with a threshold value to separate the foreground and the background from the multi-view image, and wherein the hue difference calculator calculates, as the hue difference, an area of a triangle formed between a first hue value of the first HSV color value and a second hue value of the second HSV color value on an RGB-HSV spectrum graph that includes an abscissa axis indicating a hue value and an ordinate axis indicating an intensity value.

9. The multi-view immersive content generating device of claim 8, further comprising: a guide rail, the plurality of cameras being arranged on the guide rail, wherein the guide rail has a curved shape that forms a certain radius with respect to a convergence point.

10. The multi-view immersive content generating device of claim 8, wherein the hue difference calculator calculates the area of the triangle according to Equations (1) and (2):

$$d(h,s,v) = \text{mean}(f_R, f_G, f_B) - \text{min}(f_R, f_G, f_B) \tag{1}$$

where $f_R$, $f_G$, an $f_B$ each denotes an RGB color value corresponding to an arbitrary HSV color value, mean $(f_R, f_G, f_B)$ denotes an intermediate intensity value of a maximum intensity value and a minimum intensity value the RGB color value shown on the HSV-RGB spectrum graph, and $\text{min}(f_R, f_G, f_B)$ denotes the minimum intensity value of the RGB color value, $$D = \frac{1}{2}\left(\int_{h_1}^{h_2} d(h_1, s_1, v_1)dh + \int_{h_1}^{h_2} d(h_2, s_2, v_2)dh\right) \tag{2}$$

where $d(h_1, s_1, v_1)$ denotes a difference between the maximum intensity value and minimum intensity value in the first hue value, and $d(h_2, s_2, v_2)$ denotes a difference between the maximum intensity value and minimum intensity value in the second hue value.

11. The multi-view immersive content generating device of claim 8, wherein the foreground/background separator comprises:

a color space converter configured to convert an RGB color value of each of pixels of the multi-view image into an HSI color value in a cone-shaped HSI color space with intensity as a center axis;

a saturation calculator configured to calculate a corrected saturation value by dividing a saturation value of an arbitrary pixel in the HSI color space by a maximum saturation value expressible in the HSI color space; and a comparison unit configured to compare the corrected saturation, value with the saturation value of the arbitrary pixel stored in the codebook to separate the foreground and the background from the multi-view image.

12. The multi-view immersive content generating device of claim 11, wherein the hue difference calculator calculate the corrected saturation value according to Equations (3) to (5):

$$l = \sqrt{\|\vec{v}\|^2 - \frac{(\vec{v}\cdot\vec{u})^2}{\|\vec{u}\|^2}} \tag{3}$$

$$l_{max} = \sqrt{\|\overrightarrow{v_{max}}\|^2 - \frac{(\overrightarrow{v_{max}}\cdot\vec{u})^2}{\|\vec{u}\|^2}} \tag{4}$$

$$S = l/l_{max} (0 \le S \le 1) \tag{5}$$

where $\vec{u}$ denotes a unit vector of a straight line which is expressed in an achromatic color in an RGB color space, $\vec{v}$ denotes a color vector indicating the arbitrary pixel in the RUB color space or denotes a color vector indicating the arbitrary pixel in the HSI color space, $l(0 \le l \le l_{max})$ denotes, a vertical distance from coordinates of $\vec{v}$ to the straight line in the RGB color space or denotes a vertical distance from the coordinates of $\vec{v}$ to the center axis in the HSI color space, and $\vec{v}_{max}$ denotes a vector having $l_{max}$.

13. The multi-view immersive content generating device of claim 8, wherein the foreground/background separator comprises:
   a color space converter configured to convert an RGB vector of each of pixels of the multi-view image into an HSI vector in a cone-shaped HSI color space with intensity as a center axis;
   an intensity calculator configured to calculate an intensity boundary value by applying a weight variable to an intensity value of an arbitrary pixel in the HSI color space; and
   a comparison unit configured to compare the calculated intensity boundary value with a threshold value stored in the codebook to separate the foreground and the background from the multi-view image.

14. The multi-view immersive content generating device of claim 13, wherein the intensity calculator calculates the intensity boundary value according to Equation (6):

$$\text{Intensity boundary} = \left[ \max\{\alpha I_{high}, \tau_{black}\}, \max\left\{\min\left\{\beta I_{high}, \frac{I_{low}}{\alpha}\right\}, \tau_{black}\right\} \right] \quad (6)$$

where $I_{high}$ denotes a highest intensity value among intensity values of pixels which are collected in units of one frame, $I_{low}$ denotes a lowest intensity value among the intensity values of the pixels which are collected in units of one frame, $\alpha$ and $\beta(\alpha<\beta)$ each denote the weight variable determined based on a user input, and $\tau_{black}$ denotes a threshold value that is set for the intensity boundary value not to be excessively reduced.

* * * * *